Figure 1:
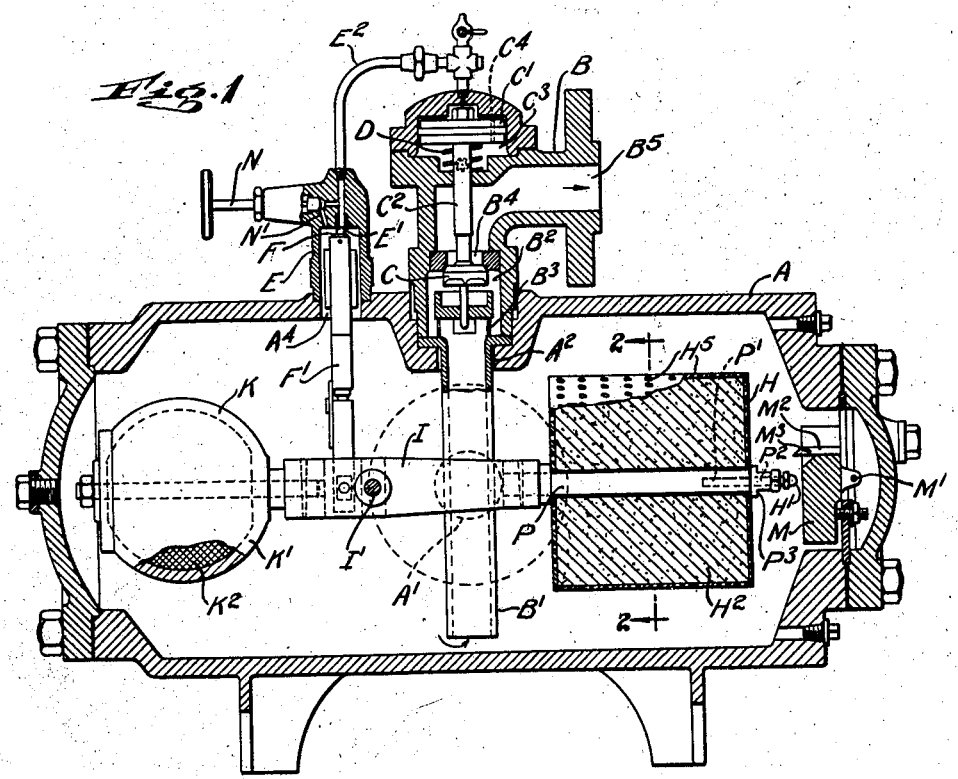

Nov. 20, 1934.   G. H. GIBSON ET AL   1,981,169
STEAM TRAP
Filed Aug. 19, 1930

INVENTORS
GEORGE H. GIBSON
FRANKLIN M. PATTERSON
BY *John E. Hubbell*
ATTORNEY

Patented Nov. 20, 1934

1,981,169

UNITED STATES PATENT OFFICE 1,981,169

STEAM TRAP

George H. Gibson, Upper Montclair, and Franklin M. Patterson, Pitman, N. J., assignors to Cochrane Corporation, Philadelphia, Pa., a corporation of Pennsylvania Application August 19, 1930, Serial No. 476,252

4 Claims. (Cl. 23—253)

Our present invention relates in general to the construction of mechanism for operating valves or other devices, and particularly, to operating mechanisms of this type which in use are normally exposed to deteriorating effects of corrosive liquids at high temperatures and pressures.

One important field of use of our invention is in apparatus for handling boiler water during or after a chemical treatment to eliminate scale-forming or other undesirable constituents of the water. After such treatment, the water usually has a substantial degree of causticity due to the presence of sodium hydrate therein and a substantial alkalinity due to the presence of the carbonate as well as the hydrate of sodium. When high temperature liquids of this character are brought into contact with certain materials, a relatively rapid corrosion of such materials will occur. When the corrodible materials form parts of an operating mechanism, the resulting corrosion is particularly disadvantageous.

Where the corrodible parts form an element or elements of an operating mechanism and the weight and size of such elements are important factors in maintaining the effectiveness of the mechanism operation, the operating efficiency will be substantially lowered by any corrosion of those elements and in many cases the mechanism will be rendered inoperative. We have found that such operating conditions and harmful effects frequently occur in the discharge valve operating mechanism of high pressure steam traps of the general type illustrated, for example, in a prior application of Franklin M. Patterson, Serial No. 379,104, filed July 18, 1929. In such apparatus, the operating mechanism, which automatically controls the discharge of accumulated condensate from the trap in response to the condensate level therein, usually comprises a solid displacement body which moves in accordance with the changes in condensate level. Displacement bodies of solid material have been found to be necessary for high pressure work as hollow floats are unable to continuously withstand the pressures present, which may be as high as two thousand pounds per square inch or even higher.

In such high pressure steam traps, the displacement body is ordinarily used in conjunction with a counterbalancing body to open and close a pilot valve controlling the admission of a motive fluid to a main discharge valve of the piston type. The bodies are preferably arranged at opposite ends of a valve operating lever fulcrumed therebetween and connected adjacent its fulcrum to the pilot valve stem. The bodies are constructed and arranged so that their net moments on the valve operating lever exert a valve opening force on the valve stem when the condensate level rises and a valve closing force when the condensate level falls. In a preferred construction illustrated in said prior application, the body at the opposite side of the lever fulcrum from the valve stem connection is larger in size, lighter in weight, and of lower specific gravity than the other body. In one such construction heretofore in use, the counterbalancing body was formed by a cast iron ball filled with lead, while the lighter displacement body was formed of solid aluminum.

We have found that aluminum is quite soluble in hot caustic or alkaline water. The corrosion of the lighter displacement body rapidly changes its size and weight and affects the force exerted by it on the valve operating lever. The heavier body is substantially unaffected by the same liquid. The change in resultant forces impairs the operation of the mechanism and in many cases renders it inoperative after a comparatively short period of use.

In attempting to avoid corrosion, the lighter displacement body has been plated or painted to provide the corrodible material with a protective coating. Plating of aluminum bodies has been found unsatisfactory, principally because of the lack of adherence of the plating to the body surfaces. Paint coatings rapidly wear away in practice.

The use of a protective container formed of steel which is substantially unaffected by hot alkaline water, for the aluminum displacement body has also been tried. A close fit between the container and body is impractical because of the substantial difference in thermal expansion characteristics of the two metals. Maintenance of the container impervious to water under all conditions of operation is extremely difficult. If water leaks into the container while the trap is subjected to the high internal pressures contemplated, and the pressure in the trap is then suddenly lowered, as would occur during a discharging action, the water within the container would exert an internal pressure thereon corresponding to the original high pressure in the trap which would gradually weaken and eventually disrupt the container. The same disadvantageous results appear when the container is filled with water or any material which gives up water under certain operating conditions.

To avoid the possibility of explosion which is always present in a partly filled container of this type, displacement bodies of stone and ceramic material have been employed. Such materials have been found unsuitable because under the rapid and extreme temperature changes which normally occur in a steam trap, the bodies tend to split and spall. In most cases, this results in a change in weight of the body.

The general object of our present invention is the provision of an improved valve operating mechanism adapted for use in apparatus containing caustic or alkaline liquids at high temperatures and under high pressures. More specifically, the object of our invention is to provide an improved construction of the lighter displacement body element of a valve operating mechanism. In carrying out our invention, we form a substantial part of the lighter displacement body of a lithic material substantially unaffected by caustic or alkaline water at high temperatures and provide means which prevent unequal heating of different portions of the body, any substantial loss in weight of the material due to spalling, and explosions due to confined water.

The various features of novelty which characterize our invention are pointed out with particularity in the claims annexed to and forming a part of this specification. For a better understanding of the invention, however, and the advantages possessed by it reference should be had to the accompanying drawing and descriptive matter in which we have illustrated and described a preferred embodiment of the invention.

Of the drawing:—

Figure 2:
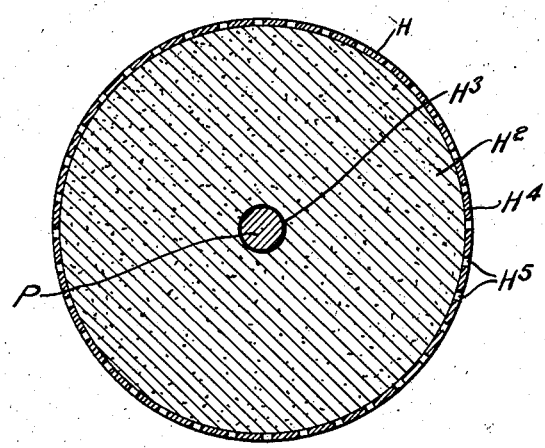

Fig. 1 is a sectional elevation with certain parts broken away of a steam trap incorporating our invention; and Fig. 2 is an enlarged section on the line 2—2 of Fig. 1.

Our present improvements are especially useful, and are hereinafter described, in connection with steam trap valve operating mechanism of the type disclosed in said prior Patterson application. As shown in Fig. 1, the trap comprises a chambered casing A, provided with a steam and condensate inlet A' and a discharge opening $A^2$, in which a discharge valve fitting B is mounted. A pipe B', extending downwardly to the lower part of the casing, communicates with a valve chamber $B^2$ through ports $B^3$. A port $B^4$ connects the valve chamber to an outlet passage $B^5$ and is controlled by an axially movable discharge valve C normally held in its closed position by the fluid pressure on its under side and by a spring D acting on a piston C', somewhat larger in area than the valve C and to which the stem $C^2$ of the valve is connected.

The piston C' is movable vertically in a chamber $C^3$ to which a motive fluid is supplied from the trap casing through a port $A^4$, a pilot valve casing E, port E', and a conduit $E^2$. A pilot valve F is axially movable in the casing E to control the port E' and thereby the supply of motive fluid to the piston chamber.

The mechanism for automatically controlling the position of the pilot valve, and thereby the position of the main discharge valve, in response to the liquid level in the casing A comprises a float lever I having a suitable pivotal connection I' with the casing and provided with a displacement body H at one end and a balancing weight K at its opposite end, constructed as hereinafter described. The pilot valve F is connected to the lever I between the lever fulcrum I' and weight K by an adjustable valve stem F'. The stem connection is constructed to provide some lost motion between the lever and valve stem so that the pilot valve will not be opened and closed until the body H reaches the upper and lower limits, respectively, of its movement. The fluid pressure in the casing tends to maintain the valve F in its closed position so long as the valve is seated.

Each cycle of operations of the trap includes an initial period in which the liquid is accumulating in the trap and during which the valves F and C are held in their closed positions. As the liquid level rises the resultant upward movement of the body H due to the floatative action thereon turns the lever I into a position in which it ultimately engages the valve stem F' and pulls the pilot valve F away from its seat. When that occurs, the fluid pressure on the valve will be equalized and the valve then moves to its wide open position by gravity. The pilot valve and stem are preferably made quite heavy to increase this gravital effect. With the valve in its wide open position, motive fluid flows through the valve casing and conduit $E^2$ into the piston chamber $C^3$. The pressure on the upper side of the piston, being greater than on the under side of the valve C, moves the latter to its wide open position. The accumulated liquid then discharges from the trap through the port $B^4$ and discharge passage $B^5$. The body H descends as the liquid level in the trap lowers and when its lower limit of movement is reached the valve F is returned to its closed position. The supply of motive fluid is thus cut off and any fluid above the piston C' can escape through a restricted passage $C^4$ therein, permitting the upward movement of the piston C' and valve C under the action of the spring D. The closing of the port $B^4$ permits the pressure in the trap to become effective and to hold the valve C seated until the pilot valve is again operated.

When steam traps of the above type have high internal pressures, the valves F and C will be subjected to excessive chattering and wire drawing unless a rapid and positive operation of the pilot valve is effected. To secure this effect, the forces acting on the valve actuating lever I should be of substantial magnitude. The construction of the displacement bodies H and K of materials having greater specific gravities than the trap liquid displaced thereby aids this result. This construction of the parts helps to provide the lever I with considerable inertia and materially augments the force available in moving the valve F from its seat under heavy load conditions in which the condensate level in the trap rises rapidly.

In order to provide a more effective trap operation when the condensate level rises very slowly, mechanism is shown for retarding the rising movement of the displacement body H as the latter approaches its highest position and subsequently yielding under the increased flotative force on the body H due to the substantial increase in condensate level while the displacement body is being held. The retarding mechanism used comprises a relatively heavy weight M pivoted at M' and provided with a tiltable projecting trigger $M^2$ pivoted at $M^3$ and arranged to be engaged by a projection H' on the body H as the latter rises. The parts are so arranged that the body cannot move upwardly past the trigger $M^2$ without first imparting a predetermined tilting movement to the weight M. After the desired weight tilting movement has occurred, the body H suddenly slips by the trigger and moves swiftly upward due to the increased flotative effect thereon, during which movement the pilot valve is quickly opened. This rapid final rising movement of the body is thus independent of the rate at which the condensate level rises. The return movement of the body when the condensate level falls is not effected by the trigger, due to the pivotal connection of the latter with the weight M.

The hand operated valve N illustrated controls a by-pass connection N' about the valve F and port E', by which the main discharge valve C may be opened as desired for test or other purposes irrespective of the position of the body H.

Steam traps of the above type have been found to be highly effective in operation as long as the liquid discharged through the trap has little or no causticity or alkalinity and the temperature thereof is relatively low. When, however, the condensate handled contains a substantial amount of caustic or alkaline substances and is at a relatively high temperature, it has been found that a rapid corrosion of the lighter displacement body will occur, if made in the usual manner. This action would quickly decrease the effectiveness of the valve operating mechanism and, in many cases, render the trap discharge mechanism inoperative. To avoid the occurrence of such undesirable effects, we have constructed the weight K with a cast iron shell K' filled with lead $K^2$ as is usual and the lighter displacement body H of a material which has the desired specific gravity and which is also substantially insoluble in caustic or alkaline water at high temperatures. We further provide a shell or canister enclosing and protecting the material and constructed to avoid the confining of any liquid that may enter the casing or be evolved from the enclosed material.

As shown in Figs. 1 and 2, the float body H consists of a solid cylindrical block $H^2$ of calcium carbonate, preferably in the form of marble and having an axial passage $H^3$ therethrough, through which a bolt P extends and connected at its inner end to the lever I. The block $H^2$ is wholly surrounded by a similarly shaped shell or canister $H^4$, preferably made of steel or iron plate, and provided with a multiplicity of perforations $H^5$. The casing is formed with central openings $H^6$ in its opposite ends through which the bolt P extends. The outer end of the bolt is formed with an axial threaded passage P' arranged to receive a smaller bolt $P^2$ carrying a flanged nut $P^3$ and by which arrangement the float H will be held in its proper position on the lever I.

With this mode of construction of the bodies H and K no deteriorating effect of any consequence will occur and the weight ratio of the bodies will be maintained constant. The only portion of the marble exposed to the action of the water is that at the perforations $H^5$. Spalling or splitting of the marble due to sudden localized temperature changes in the material is largely avoided by the use of the protective shell. Any spalling of the marble that may occur will not affect the operation of the trap as marble has no tendency to crumble into such small particles as could escape through the perforations in the shell. Any spalls will be held in substantially their original position by the shell. The perforations in the shell are of special importance in avoiding the confinement of water within the float and the possibility of a subsequent explosion on a sudden drop in pressure in the trap. The shell perforations are made small enough to retain any spalls from the marble and yet sufficiently numerous and large enough to allow any water and vapor that may be present to easily escape when the trap pressure is reduced.

Other carbonates of calcium or magnesium, such as limestone or dolomite, may be used in the body H, provided that they are not affected by caustic or alkaline water at high temperatures either because of their insolubility in such water or the presence of the compounds in the water in such quantities as to render it substantially saturated.

When in the chemical treatment of the water, phosphates or phosphoric acid are supplied in addition to the supply of caustic alkali to combine with any excess calcium present, there is a tendency for any phosphates not neutralized by the calcium to corrode the lighter displacement body, when calcium carbonate is used as the filling material thereof. In such case, it would be preferable to form the lighter displacement body of a phosphate, such as calcium phosphate, which would be substantially unaffected by the high temperature liquid because of its presence therein in saturating quantities. Calcium phosphate in its material form as apatite contains some calcium chloride. This can be dissolved out before being used in the displacement body.

Furthermore, the perforated shell may be used in some cases with a material somewhat soluble in the alkaline water as in that case the corrosion will be mainly confined to the material immediately adjacent the perforations. This arrangement is, however, less satisfactory than the preferred materials described.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention what we claim as new and desire to secure by Letters Patent is:—

1. A high pressure trap comprising the combination with a casing adapted to contain a high temperature caustic and/or alkaline liquid, of an operating mechanism positioned in said casing and exposed to said liquid and including a displacement body movable in accordance with changes in level of said liquid and comprising material of less specific density than iron and selected from the group of materials consisting of calcium carbonate and calcium phosphate, and which is exposed to, but is substantially unaffected by said liquid.

2. A high pressure trap adapted for use with a caustic and/or alkaline liquid at high temperatures and comprising a casing having a passage, a valve controlling said passage, and controlling means for said valve including a float lever and a pair of displacement bodies connected to said lever at spaced apart points and arranged to subject said lever to a torque changing in magnitude and direction as the liquid level in said casing rises and falls, the lighter displacement body including a mass of calcium carbonate which is exposed to but is substantially insoluble in said liquid.

3. A high pressure trap adapted for use with caustic and/or alkaline water at high temperatures and comprising a casing having an inlet and an outlet, a valve controlling said outlet, and controlling means for said valve including a float lever and a pair of displacement bodies of different densities connected to said lever at spaced apart points and arranged to subject said lever to a torque changing in magnitude and direction as the liquid level in said casing rises and falls, the lighter density body consisting of a metallic shell enclosing a solid mass of calcium carbonate substantially insoluble in hot alkaline water, said shell being formed with small perforations to permit the escape of fluid from the shell while preventing the escape therefrom of spalled calcium carbonate.

4. A high pressure trap comprising the combination with a casing adapted to contain a high temperature corrosive liquid containing an excess of phosphoric material, of an operating mechanism positioned in said casing and exposed to said liquid and including a solid displacement body movable in accordance with changes in level of said liquid and formed of calcium phosphate.

GEORGE H. GIBSON.
FRANKLIN M. PATTERSON.